US008695929B2

(12) United States Patent
Cox (10) Patent No.: US 8,695,929 B2
(45) Date of Patent: Apr. 15, 2014

(54) VERTICAL CABLE SUPPORT STRUCTURES AND METHODS

(75) Inventor: Martin Cox, Surrey (CA)

(73) Assignee: Martin Cox, Surrey (CA)

( * ) Notice: Subject to any disclaimer, the term of this patent is extended or adjusted under 35 U.S.C. 154(b) by 256 days.

(21) Appl. No.: 13/028,934

(22) Filed: Feb. 16, 2011

(65) Prior Publication Data

US 2012/0205500 A1 Aug. 16, 2012

(51) Int. Cl.
*F16L 3/22* (2006.01)
*H02G 3/30* (2006.01)

(52) U.S. Cl.
USPC .............................. 248/68.1; 174/100; 248/56

(58) Field of Classification Search
USPC ............... 248/56, 58, 65, 68.1, 73, 74.1, 317; 174/100, 101, 151, 155, 481, 146, 51, 174/72 A, 72 R, 70 R; 439/136, 142
See application file for complete search history.

(56) References Cited

U.S. PATENT DOCUMENTS

| | | | | |
|---|---|---|---|---|
| 2,888,546 | A * | 5/1959 | Kinney | 174/146 |
| 3,023,989 | A * | 3/1962 | White | 248/68.1 |
| 3,618,882 | A | 11/1971 | Podedworny et al. | |
| 4,249,353 | A * | 2/1981 | Berry | 248/56 |
| 5,992,802 | A * | 11/1999 | Campbell | 248/68.1 |
| 7,000,784 | B2 * | 2/2006 | Canty et al. | 211/26 |
| 7,119,282 | B2 * | 10/2006 | Krietzman et al. | 174/101 |
| 7,778,513 | B2 * | 8/2010 | Rinderer et al. | 385/134 |
| 7,893,356 | B2 * | 2/2011 | Garza et al. | 174/100 |
| 8,294,030 | B2 * | 10/2012 | Pollard, Jr. | 174/155 |
| 2007/0246613 | A1 * | 10/2007 | Kennedy | 248/56 |
| 2010/0019106 | A1 | 1/2010 | Sisley | |
| 2010/0258686 | A1 | 10/2010 | Sutton et al. | |

OTHER PUBLICATIONS

Kellems Wire Management Products: Support Grips—Heavy Duty, Standard Duty, Light Duty; Tin-Coated Bronze/Stainless Steel.
Kellems Wire Management Products: Support Grips—Heavy Duty, Standard Duty, Light Duty.

* cited by examiner

*Primary Examiner* — Tan Le
(74) *Attorney, Agent, or Firm* — Richard A. Johnson; Borden Ladner Gervais LLP (57) ABSTRACT

Apparatus for supporting one or more cables in a generally vertical orientation comprises a support structure extending along a generally vertical direction and a plurality of support blocks positioned along the vertical support structure. Each of the support blocks has one or more cable openings defined therethrough. The support blocks comprise a plurality of first group support blocks and a plurality of second group support blocks. The cable openings of the first group support blocks are aligned with each other, and the cable openings of the second group support blocks are aligned with each other and horizontally offset from the cable openings of the first group support blocks.

15 Claims, 8 Drawing Sheets

VERTICAL CABLE SUPPORT STRUCTURES AND METHODS

TECHNICAL FIELD

The present invention relates to supporting cables in generally vertical orientations. Certain embodiments provide vertical cable buses and other supporting structures configured to support a plurality of cables such as high power electrical cables.

BACKGROUND

High power and other cables can be required to extend vertically, for example up the side of an exterior or interior wall of a building or other support structure. In some cases, the tops of such cables are attached to or draped over the support structure. It is undesirable for the entire weight of cables to be supported at the top of the vertical section of cable. There is a danger of fraying, pinching and damage to the insulation of the cables when their weight is supported in this manner.

One solution in the prior art is to install a mesh-like sleeve on each individual cable which is supported at the top of the vertical section of cable and helps reduce the weight carried by the cable itself. These sleeves are time consuming to install on each individual cable and bring the risk of pinching, scoring or other damage to the cable insulation.

It may also undesirable for cables to be exposed or for the cables to be in contact with one another in an installation. There may be a danger of contact with the cables by individuals and a risk of damage from the environment if cables are exposed.

The inventor has determined a need for simple, easy to install systems for supporting generally vertically installed cables.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect provides an apparatus for supporting one or more cables in a generally vertical orientation comprises a support structure extending along a generally vertical direction and a plurality of support blocks positioned along the vertical support structure. Each of the support blocks has one or more cable openings defined therethrough. The support blocks comprise a plurality of first group support blocks and a plurality of second group support blocks. The cable openings of the first group support blocks are aligned with each other, and the cable openings of the second group support blocks are aligned with each other and horizontally offset from the cable openings of the first group support blocks.

Another aspect provides a method for supporting one or more cables in a generally vertical orientation. The method comprises providing a support structure extending along a generally vertical direction, positioning a plurality of support blocks along a length of the vertical support structure, each of the support blocks having one or more cable openings defined therethrough, the plurality of support blocks comprising a plurality of first group support blocks and a plurality of second group support blocks, wherein the cable openings of the first group support blocks are aligned with each other, and the cable openings of the second group support blocks are aligned with each other and horizontally offset from the cable openings of the first group support blocks, and, positioning one or more cables through corresponding ones of the one or more cable openings of the first and second group support blocks.

Further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
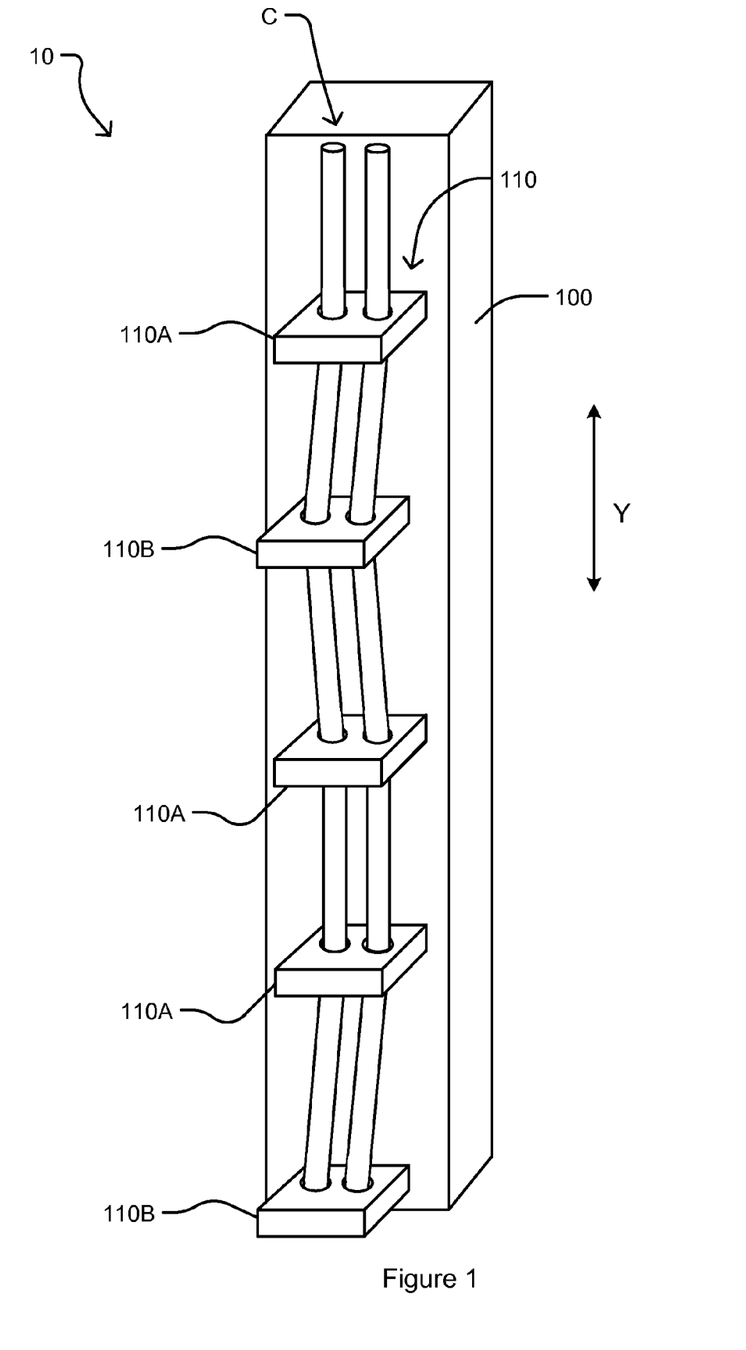
FIG. 1 shows an example cable support system according to one embodiment.
Figure 1A:
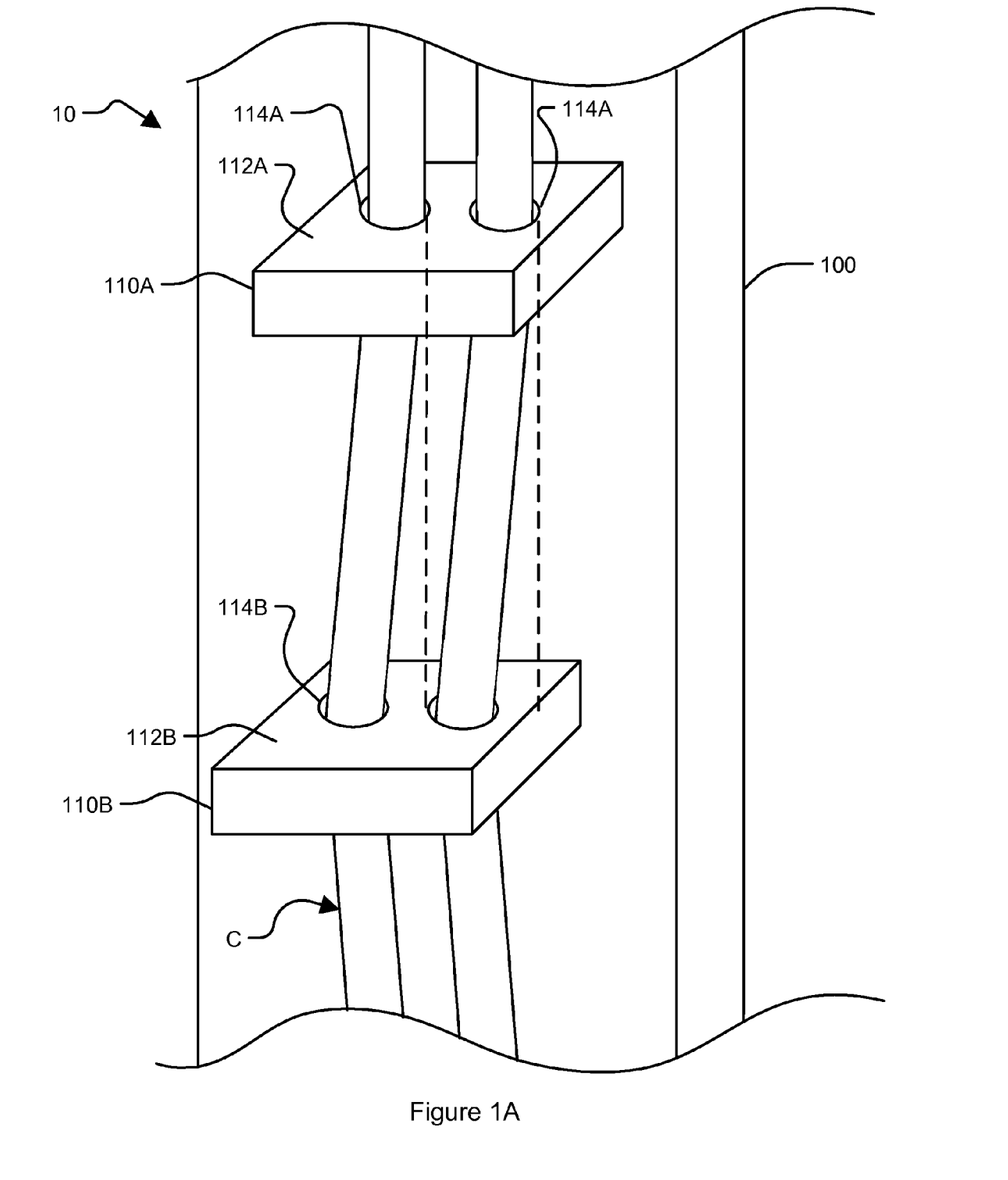
FIG. 1A shows an enlarged view of a portion of the system of FIG. 1.

FIGS. 1 and 1A show an example vertical cable support system 10 for supporting cables C extending along a generally vertical direction Y. Cables C may comprise, for example, electrical power cables, telecommunication cables, or other types of cables. A vertical support 100 extends along a length of cables C. A plurality of cable support blocks 110 are coupled to vertical support 100 along the length thereof. Support blocks 110 comprise a plurality of first group support blocks 110A and a plurality of second group support blocks 110B.

Support blocks 110 comprise block bodies 112 having one or more cable openings 114 (see FIG. 1A) defined therein configured to accept cables C. Openings 114 are illustrated as cylindrical passageways with circular cross sections through bodies 112, but it is to be understood that this is not necessary. Openings 114 may, in some embodiments, be elliptical, rectangular or other shaped passageways, or slots extending from an edge of bodies 112. In some embodiments openings 114 are sized and shaped based on the sizes and shapes of cables C. In some embodiments each opening 114 may be configured to leave a clearance of about 0.002" to about 0.025" around a corresponding cable C. For example, where cables C have circular cross sections, openings 114 may also be circular and have diameters of about 0.005" to about 0.050" larger than the diameters of corresponding cables. The configurations of support blocks 110 also maintain cables C at a predetermined distance from one another due to the separation between openings 114.

Support blocks 110 may be welded to vertical support 100. Alternatively, Support blocks 110 may be integrally formed with vertical support 100. Support blocks 110 may also be attached in other ways such as, for example, by rivets, nuts and bolts, screws, or adhesives.

Block bodies 112 are solid pieces in the illustrated embodiment. Block bodies 112 may have other configurations in some embodiments. Block bodies 112 may comprise two pieces separated along the center of openings 114 for example. Block bodies 112 may also be composed of more than two pieces. Block bodies 112 may also have reinforcement members (not shown) coupled thereto in some embodiments. In some embodiments, block bodies 112 may comprise, for example, ultra-high-molecular-weight polyethylene. Block bodies 112 may be constructed from other materials in other embodiments, such as, for example, fibreglass, polyvinyl chloride (PVC), fire treated maple, or other suitable materials.

Each opening 114A of first group support blocks 110A has a corresponding opening 114B of second group support blocks 110B. Openings 114A of first group support blocks 110A are aligned with each other, and openings 114B of second group support blocks 110B are aligned with each other, but corresponding first group openings and second group openings 114A and 114B are offset from one another in a horizontal direction. The offset between first group openings and second group openings 114A and 114B may be provided by block bodies 112A and 112B being horizontally offset with respect to each other (as in the example of FIG. 1), openings 114A and 114B being differently positioned in respective block bodies 112A and 112B, or a combination thereof.

In some embodiments, first and second group support blocks 110A and 110B may be substantially identical in construction, with openings 114A and 114B asymmetrically positioned with respect to bodies 112A and 112B, respectively. In such embodiments, the offset may be provided by positioning first and second group blocks in orientations rotated 180 degrees from each other, such that bodies 112A and 112B may be aligned while still providing a desired horizontal offset between openings 114A and 114B.

First and second group support blocks 110A and 110B are interspersed such that cables C change direction while passing through at least some of the support blocks 110. The change in direction allows a portion of the weight of cables C to be supported by support blocks 110. In some embodiments, support blocks 110 may be arranged such that the longest section of cables C between a change in direction of cables C is less than a predetermined length. For example, in some embodiments the longest section of cables C between a change in direction of cables C is between about 36 to 54 inches. First and second group support blocks 110A and 110B may be arranged in either a regular or irregular alternating fashion.

The changes of direction of cables C occurring at each transition between a first group support block 110A and a second group support block 110B (and vice versa) result in friction between cables C and support blocks 110. The friction results in some of the weight of cables C being borne by support blocks 110. This support reduces the load that must be borne by connections at the top of the vertical section of cables and/or by the cables themselves. Further, each support block 110 only supports a section of the weight of the cables C. The greater the number of support blocks 110, and the greater the number of transitions between first and second group support blocks 100A and 110B, the more distributed the weight. Increased weight distribution may result in a reduced magnitude of stress concentrations on, less damage to, and longer life-cycles of cables C.

Figure 2:
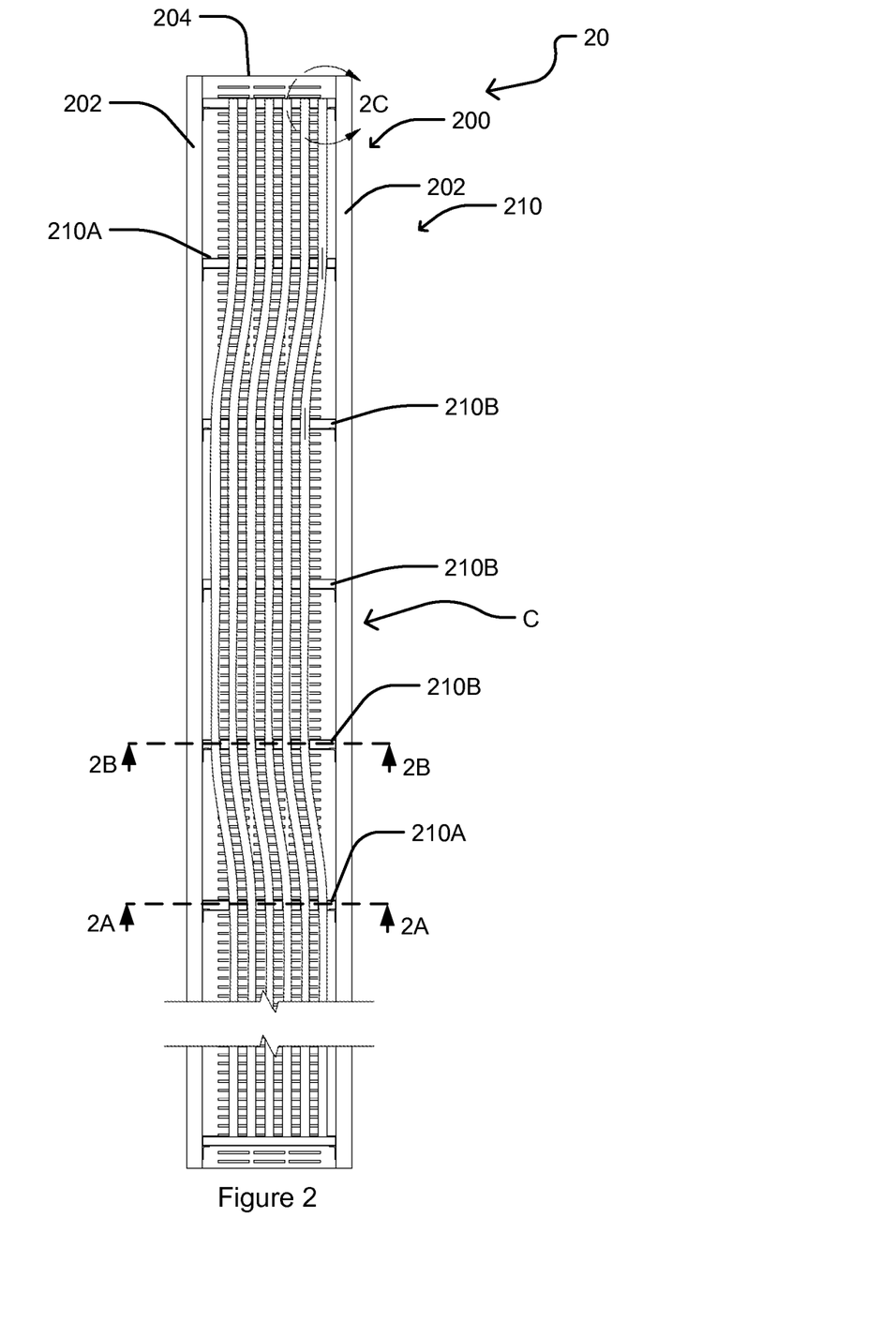
FIG. 2 shows an example cable support system according to another embodiment.
Figure 3:
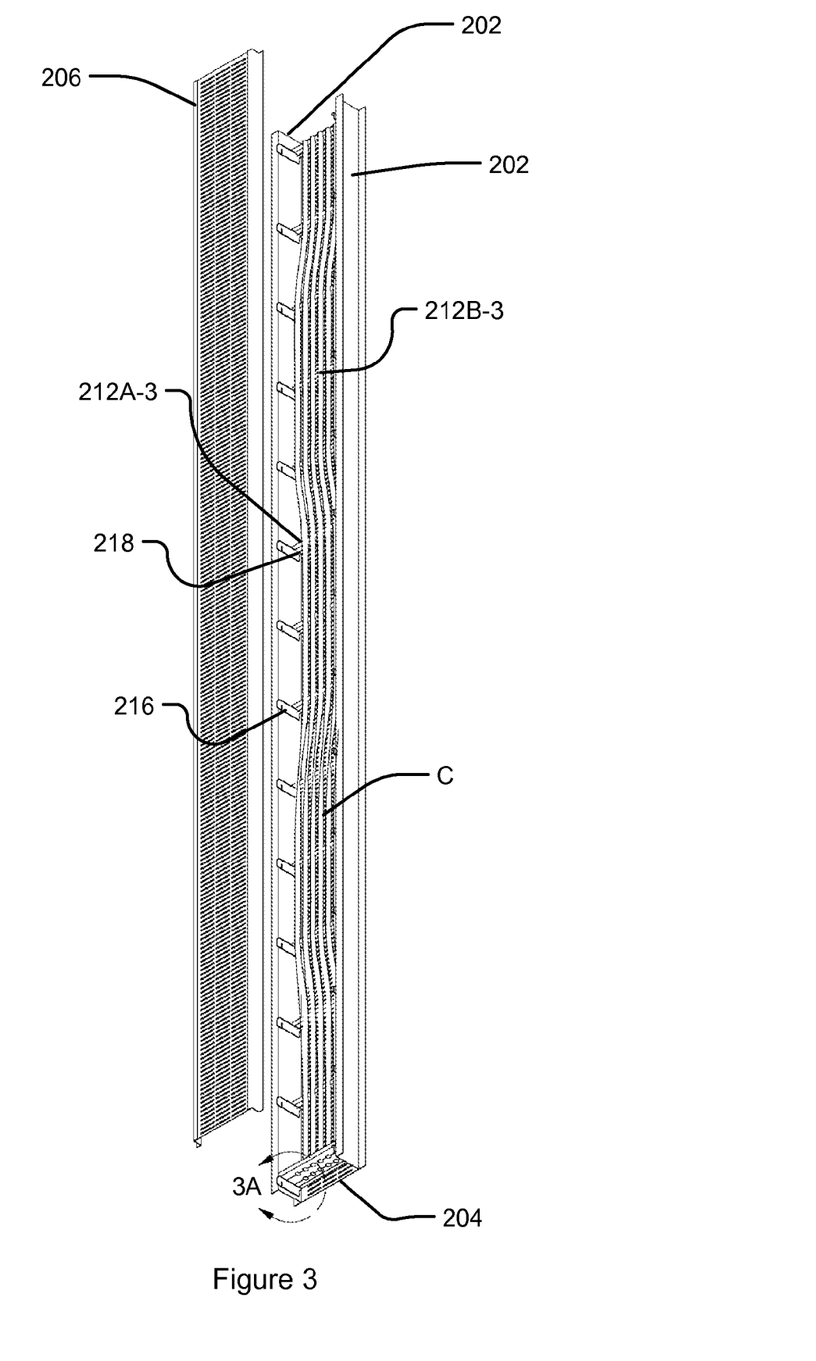
FIG. 3 is an isometric view of the cable bus system of FIG. 2 with a cover.
Figure 3A:
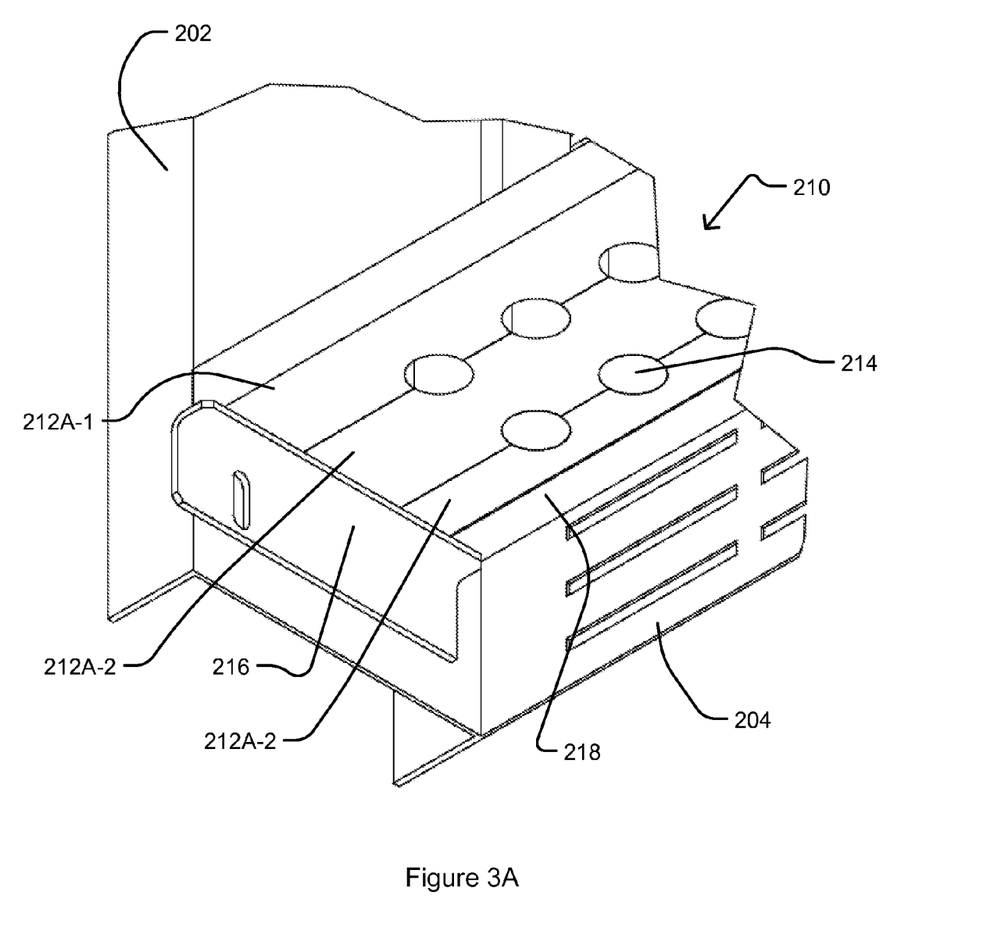
FIG. 3A shows an enlarged view of a portion of the system of FIG. 3 indicated by circle 3A.

FIGS. 2 and 3 show an example vertical cable bus system 20. System 20 comprises a vertical support enclosure 200 extends along a length of cables C. Enclosure 200 is configured to be secured to a wall or other generally vertical supporting surface, for example by suitable wall brackets (not shown) anchored to the supporting surface. Support blocks 210 are spaced along the length of enclosure 200 and to support cables C and maintain the cables C a predetermined separation distance from one another. The separation distance may be determined by the diameter or diameters of cables C as well as other design requirements such as the number of cables and the magnitudes of the electric fields generated by the cables, cooling requirements, available space, and other factors. For example, in some embodiments, the separation distance between cables C may be approximately the same as the diameters of cables C. This spacing may be increased in some embodiments to provide for improved cooling, or decreased in some embodiments to reduce the overall size of system 20.

In the illustrated example, enclosure 200 comprises side rails 202 and sheet 204. Rails 202 may, for example, be secured by bolting to wall brackets secured to a wall or other generally vertical supporting surface. Rails 202 provide support and connection points for support blocks 210. Rails 202 are connected by sheet 204. As described below, rails 202 may also be connected by reinforcement members 218 or "rungs" which are coupled to support blocks 210. Enclosure 200 surrounds cables C on three sides. As shown in FIG. 3, a cover 206 may be attached over the open side of enclosure 200. Cover 206 may, for example, be attached to rails 202 using sheet metal screws or blots. In some embodiments, cover 206 may be provided in a plurality of sections to permit access to portions of enclosure 200 without requiring the entire cover to be removed. In other embodiments, cover 206 may comprise a single piece. In the illustrated embodiment, sheet 204 and cover 206 comprise perforations (not specifically enumerated) for ventilation, to provide a free air rating for cables C. In other embodiments, sheet 204 and/or cover 206 may be solid. Cover 206 may also have other shapes in other embodiments. For example, in some embodiments cover 206 may be peaked. In a preferred embodiment, rails 202, sheet 204 and cover 206 may be made of aluminum. In alternative embodiments rails 202, sheet 204 and cover 206 may be made of other materials, such as steel or other metals, plastic, concrete, carbon fiber or other materials.

Support blocks 210 may be spaced about eighteen inches from one another, although this spacing will vary depending on the number and type of cables supported. In some embodiments, support blocks 210 are coupled to enclosure 200 on at least two sides. In the example of FIGS. 2-3, as best seen in FIGS. 2A-2C and 3A, a pair of brackets 216 are attached (for example, by welding) to rails 202, and positioned on either side of each support block 210, which rests atop the pair of brackets 216. Blocks 210 are typically not secured to brackets 216, but may be in some embodiments. Brackets 216 may be constructed from the same material as rails 202, sheet 204 and cover 206 of enclosure 200 (e.g. when enclosure 200 is constructed from aluminum, brackets 216 may also be constructed from aluminum). Brackets 216 transfer the load of the cables from support blocks 201 to rails 202.

In the illustrated embodiment, a reinforcement member 218 is coupled to a "bottom" edge (i.e., the edge nearest sheet 204) of each support block 210, as described further below with respect to FIGS. 4A-D. Reenforcement members 218 may be constructed from the same material as rails 202, sheet 204 and cover 206 of enclosure 200. Reinforcement members 218 span between brackets 216 to provide increased stiffness to support blocks 201. Such reinforcement member 218 at the bottom edges of block 210 may be referred to as "rungs." The rungs may be positioned about ⅝" to ½" from sheet 204 in some embodiments. In some embodiments, additional rungs (not shown) may be coupled between rails 202 at locations between support blocks 210 to provide increased structural integrity to enclosure 200 (for example, in installations where high wind shear is expected). In some embodiments, an additional reinforcement member (not shown) may be coupled to the "top" edge (i.e. the edge nearest cover 206) of each support block 210. Such reinforcement members at the top edges of block 210 may be referred to as "top stiffeners," and may be constructed from the same material as enclosure 200. Top stiffeners may, for example, be provided in implementations where support blocks are wider than a predetermined with (e.g. about 24 inches), or where support blocks 210 are required to support heavier loads.

Figure 2A:
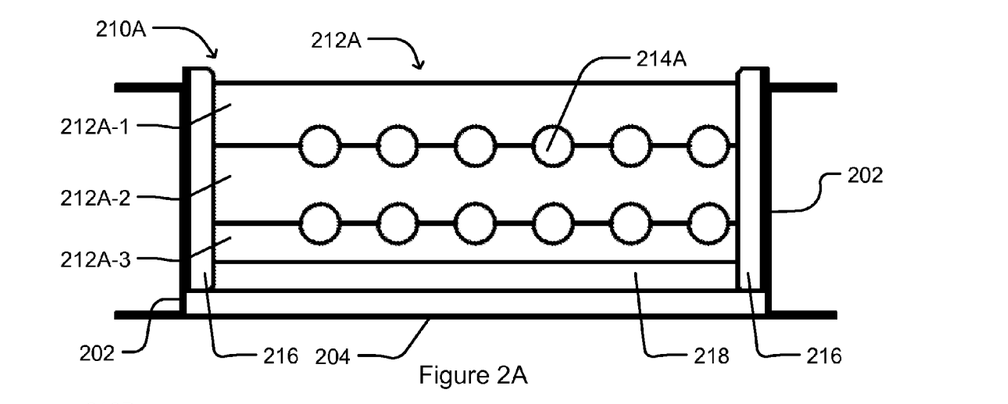
FIG. 2A is a sectional view taken along line 2A-2A of FIG. 2.
Figure 2B:
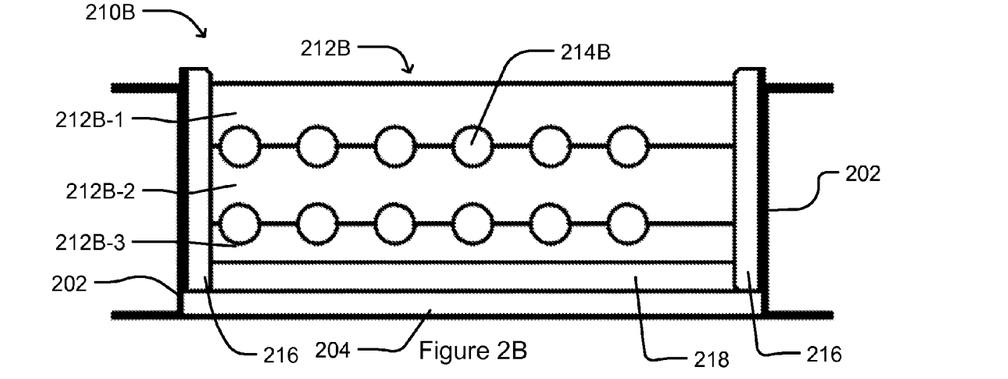
FIG. 2B is a sectional view taken along line 2B-2B of FIG. 2.
Figure 2C:
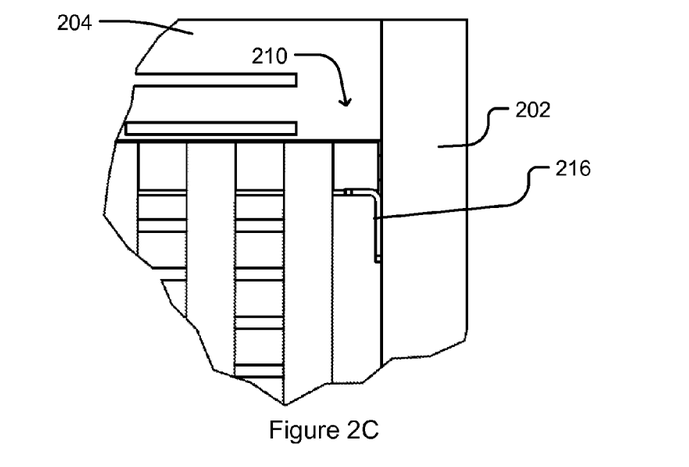
FIG. 2C shows an enlarged view of a portion of the system of FIG. 2 indicated by circle 2C.

FIG. 2A shows an example first group support block 210A comprising a block body 212A having three pieces (individually labeled 212A-1, 212A-2 and 212A-3). Openings 214A are defined through the block body 212A, and arranged in two rows, with one row of openings 214A centered at the interface between body pieces 212A-1 and 212A-2, and another row of openings 214A centered at the interface between body pieces 212A-2 and 212A-3. Likewise, FIG. 2B shows an example second group support block 210B comprising a block body having three pieces (individually labeled 212B-1, 212B-2 and 212B-3). Openings 214B are defined through the block body 212B, and arranged in two rows, with one row of openings 214B centered at the interface between body pieces 212B-1 and 2121B-2, and another row of openings 214B centered at the interface between body pieces 212B-2 and 212B-3.

As best seen in FIGS. 2A and 2B, first group support blocks 210A and second group support blocks 210B may be substantially identically constructed, and installed with bodies 212A and 212B rotated 180 degrees with respect to each other to provide the desired offset. Such a configuration advantageously avoids the need to manufacture two types of support blocks. In some embodiments, first group support blocks 210A and second group support blocks 210B may be differently constructed such that the blocks can't simply be flipped over to provide the offset. For example, in some embodiments a slot may be cut into the side of each of first group support blocks 210A and second group support blocks 210B for receiving an internal ground cable.

Again referring to FIGS. 2A and 2B each of first group openings 214A has a second group opening 214B which corresponds thereto, such that a single cable may pass through corresponding first and second group openings 214A and 214B. First group openings 214A are horizontally offset from corresponding second group openings 214B such that cables C change direction at transitions between first and second group support blocks 210A and 210B, thereby causing friction for supporting cables C as described above. In some embodiments, the magnitude of the offset may be between one and four inches. In other embodiments the offset may be between a quarter of an inch and ten inches. In yet other embodiments, the offset may be greater than ten inches. The offset, and thus change in direction, may be selected based on the type and weight of cables C to be supported by support blocks 210.

In the example of FIGS. 2 and 3, first group support blocks 210A and second group support blocks 210B are arranged in interleaved bunches of three. However first group support blocks 210A and second group support blocks 210B may be differently arranged in other embodiments. In some embodiments, the length of cable supported between each change in direction (i.e., transition between first group support blocks 210A and second group support blocks 210B) may be between three and four feet. In some embodiments, the length of cable between each change in direction may be between about 36 inches and about 54 inches. In some embodiments, the length of cable between each change in direction may be between ten inches and eight feet.

FIGS. 4A-D illustrate how a body piece of a support block may be attached to a reinforcement member 218 in one embodiment. The illustrated example shows a reinforcement member 218 which functions as a rung attached to a bottom body piece 212A-3 (although only four partial openings are defined in piece 212A-3 in the example of FIG. 4A, as opposed to the six partial openings shown in FIG. 2A). Rungs may similarly be attached to bottom body pieces 212B-3. Likewise, the same or similar structural features may be used to attach reinforcement members 218 in the form of top stiffeners to top body pieces 212A-1 and 212B-1.

Figure 4A:
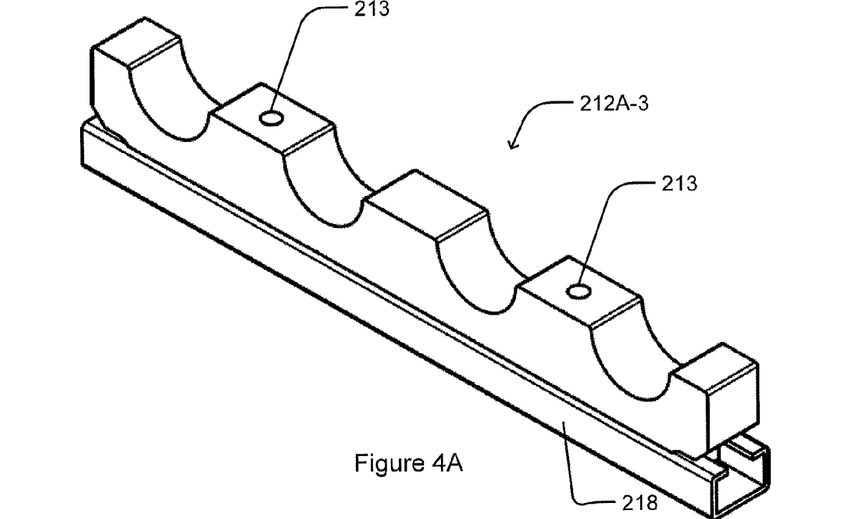
FIG. 4A is an isometric view of a support block body piece and a reinforcement member in isolation.
Figure 4B:
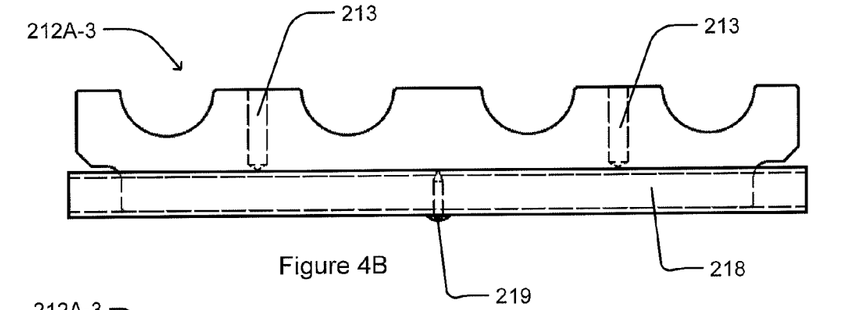
FIG. 4B is a side view of the support block body piece and reinforcement member of FIG. 4A.
Figure 4C:
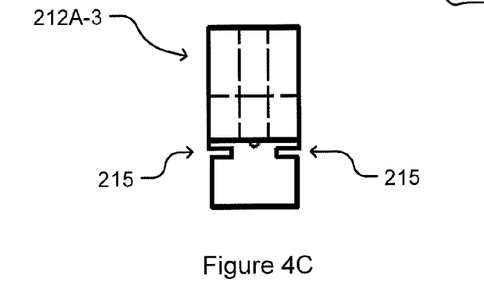
FIG. 4C is an end view of the support block body piece of FIG. 4A.
Figure 4D:
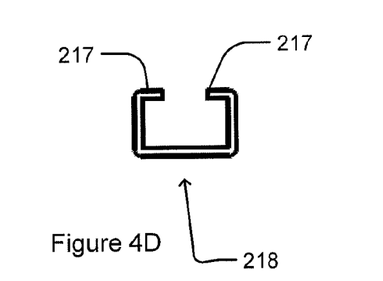
FIG. 4D is an end view of the reinforcement member of FIG. 4A.

As best seen in FIGS. 4A and 4D, reinforcement member 218 has a generally C-shaped cross section, with flanges 217 at the edges thereof. As shown in FIG. 4C, body piece 212A-3 has slots 215 defined therein configured to accept flanges 217. Reinforcement member 218 may thus be attached to body piece 212A-3 by sliding flanges 217 into slots 215, and then inserting a screw 219 (see FIG. 4B) through a hole in reinforcement member 218 and into a corresponding threaded hole in body piece 212A-3.

As best seen in FIG. 4B, the ends of reinforcement member 218 extend slightly beyond the ends of body piece 212A-3, such that the ends of reinforcement member 218 may extend into apertures or recesses defined in rails 202. The ends of reinforcement member 218 may also be welded to rails 202.

FIGS. 4A and 4B also show bolt holes 213 defined in bottom body piece 212A-3. Bolt holes 213 are threaded and configured to accept bolts (not shown) inserted through corresponding bolt holes in a middle body piece 212A-2 for securing middle body piece 212A-2 to bottom body piece 212A-3. Top body piece 212A-1 may be similarly secured to middle body piece 212A-2.

In a typical implementation, vertical cable bus system 20 of FIGS. 2 and 3 may, for example, be installed by providing enclosure 200 with bottom body pieces 212A-3 and 212B-3 pre-installed in reinforcement members (rungs) 218 which extend between rails 202. Rungs 218 may be attached to rails 202 by, for example, providing apertures or recesses in rails 202 configured to accept the ends of rungs 218, and/or welding the ends of rungs 218 to rails 202. Brackets 216 are also typically pre-installed in enclosure 200, for example by welding a pair of brackets to rails 202 at each location where a support block 210 will be positioned. Enclosure 200 is then attached to a wall (or other supporting surface), for example, by anchoring suitable wall brackets to the wall and bolting rails 202 to the wall brackets.

Once enclosure 200 is in place a first row of cables are positioned in the partial openings defined in bottom body pieces 212A-3 and 212B-3, and then middle body pieces 212A-2 and 212B-2 are secured to bottom body pieces 212A-3 and 212B-3, respectively, for example by bolts inserted through corresponding bolt holes. Next, a second row of cables are positioned in the partial openings defined in middle body pieces 212A-2 and 212B-2, and then top body pieces 212A-1 and 212B-1 are secured to middle body pieces 212A-2 and 212B-2, respectively, for example by bolts inserted through corresponding bolt holes. In embodiments where additional reinforcement members 218 in the form of top stiffeners are desired, the top stiffeners may be attached to top body pieces 212A-1 and 212B-1 before top body pieces 212A-1 and 212B-1 are secured to middle body pieces 212A-2 and 212B-2. After top body pieces 212A-1 and 212B-1 are in place, cover 206 is attached to enclosure 200, for example by sheet metal screws or bolts inserted through corresponding holes in cover 206 and rails 202. In some embodiments, cover 206 may be provided in a plurality of sections. In other embodiments, cover 206 may comprise a single piece.

In the example of FIGS. 2 and 3, the offset between first and second group openings 214A and 214B is along a direction generally parallel to a width of enclosure 200. In other embodiments, the offset may be provided along different directions, as described below with reference to FIGS. 5A to 5C.

Figure 5A:
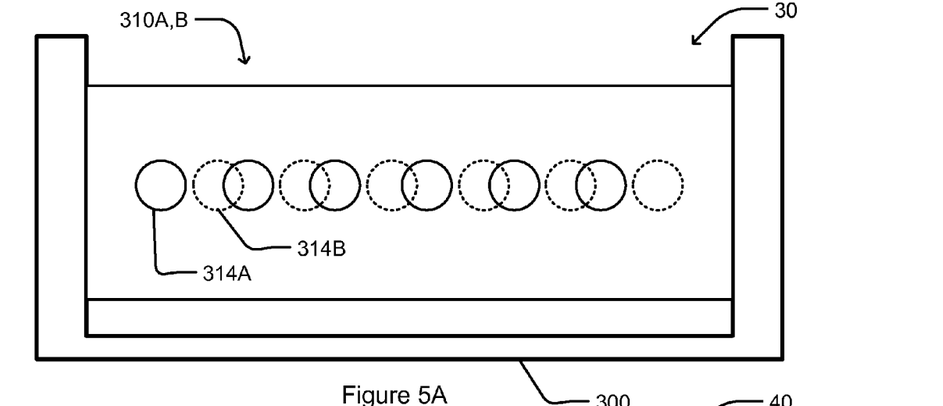
FIG. 5A shows relative positions of cable openings of two different groups of cable support blocks according to one embodiment.
Figure 5B:
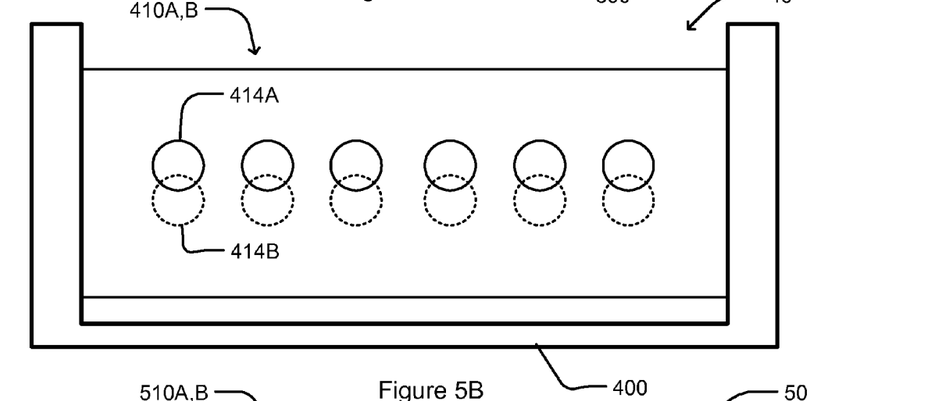
FIG. 5B shows relative positions of cable openings of two different groups of cable support blocks according to another embodiment.
Figure 5C:
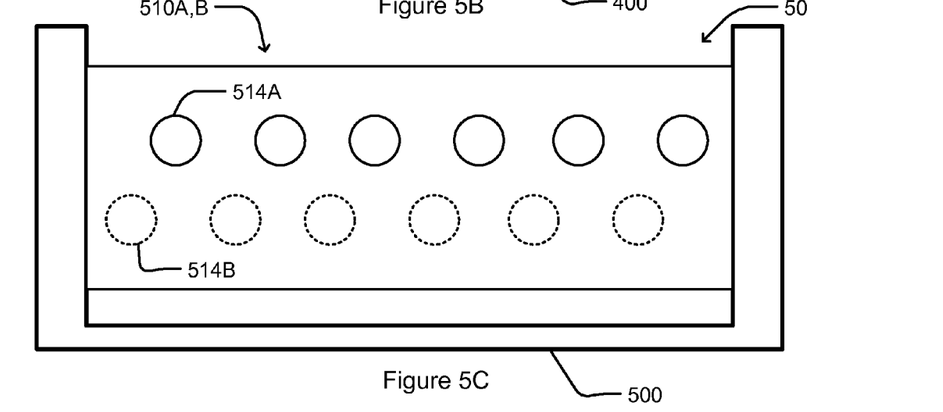
FIG. 5C shows relative positions of cable openings of two different groups of cable support blocks according to another embodiment.

FIG. 5A shows a sectional view of an example support system 30 comprising an enclosure 300 with first and second group support blocks 310A, 310B positioned therein. First group openings 314A (indicated by solid lines) and second group openings 314B (indicated by broken lines) are offset from each other along a direction generally parallel to the width of enclosure 300, similar to the example of FIGS. 2 and 3. FIG. 5B shows a sectional view of an example support system 40 comprising an enclosure 400 with first and second group support blocks 410A, 410B positioned therein. First group openings 414A (indicated by solid lines) and second group openings 414B (indicated by broken lines) are offset from each other along a direction generally perpendicular to the width of enclosure 400. FIG. 5C shows a sectional view of an example support system 40 comprising an enclosure 500 with first and second group support blocks 510A, 510B positioned therein. First group openings 514A (indicated by solid lines) and second group openings 514B (indicated by broken lines) are offset from each other along a direction at an acute angle to the width of enclosure 500. As one skilled in the art will appreciate, other offset directions are also possible.

The examples discussed above contemplate two groups of support blocks, each group of blocks having openings aligned with each other but not aligned with openings of the other group. Although two groups of support blocks with offset openings are often sufficient to provide support for generally vertically oriented cables, more than two groups of support blocks are also possible. For example, in some embodiment three or more groups of support blocks may be provided, with each group of blocks having openings aligned with each other but not aligned with openings of the other groups.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An apparatus for supporting one or more cables in a generally vertical orientation, the apparatus comprising:
a support structure extending along a generally vertical direction, the support structure comprising an enclosure comprising a pair of generally parallel side rails and one or more connecting members extending between the side rails; and,
a plurality of support blocks positioned along a length of the vertical support structure, each of the support blocks oriented generally horizontally and having one or more cable openings defined therethrough extending generally vertically from an upper side of the support block to a lower side of the support block, the plurality of support blocks comprising a plurality of first group support blocks and a plurality of second group support blocks, wherein the cable openings of the first group support blocks are vertically aligned with each other, and the cable openings of the second group support blocks are vertically aligned with each other and horizontally offset from the cable openings of the first group support blocks such that cable openings of the first group support blocks are not vertically aligned with cable openings of the second group support blocks.

2. An apparatus according to claim 1 wherein the first group of support blocks and the second group of support blocks are arranged in alternating fashion.

3. An apparatus according to claim 1 wherein the first group of support blocks and the second group of support blocks are arranged in interleaved bunches of two or more.

4. An apparatus according to claim 1 wherein each cable opening is configured to provide a clearance of about 0.002" to about 0.025" around a cable passing therethrough.

5. An apparatus according to claim 1 wherein the one or more connecting members comprise a sheet extending between the side rails.

6. An apparatus according to claim 1 wherein each of the first and second group support blocks comprises a block body extending between the side rails.

7. An apparatus according to claim 6 wherein each block body is supported by a pair of brackets attached to the side rails.

8. An apparatus according to claim 6 wherein each block body comprises two or more pieces, with the openings positioned along interfaces between the pieces.

9. An apparatus according to claim 6 comprising a reinforcement member extending along an edge of each of the first and second group support blocks.

10. An apparatus according to claim 9 wherein the reinforcement members comprise rungs extending along the edge of each of the first and second group support blocks closest to the sheet, and wherein ends the rungs are secured to the side rails.

11. An apparatus according to claim 10 comprising an additional reinforcement member comprising a top stiffener extending along an edge of each of the first and second group support blocks farthest from the sheet.

12. An apparatus according claim 9 wherein each reinforcement member has a generally C-shaped cross section with a pair of flanges at the edges thereof, and wherein each block body has a pair of slots defined therein and configured to accept the pair of flanges.

13. An apparatus according to claim 6 wherein the block bodies of the first and second group support blocks are substantially identical with openings asymmetrically positioned in the block body, and wherein the block bodies of the first and second group support blocks are rotated 180 degrees with respect to each other.

14. An apparatus according to claim 5 comprising a cover positioned over an open side of the enclosure, wherein the cover is attached to the side rails.

15. An apparatus according to claim 1 wherein the one or more connecting members comprise a plurality of rungs extending between the side rails.

\* \* \* \* \*